US009235932B2

(12) United States Patent  
Choi et al.

(10) Patent No.: US 9,235,932 B2  
(45) Date of Patent: Jan. 12, 2016

(54) METHOD AND APPARATUS TO GENERATE 3D VOLUME-PANORAMA IMAGE BASED ON 3D VOLUME IMAGES

(75) Inventors: Ouk Choi, Yongin-si (KR); Yong-sun Kim, Yongin-si (KR); Jung-ho Kim, Yongin-si (KR); Seong-deok Lee, Seongnam-si (KR); Do-kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 13/552,880

(22) Filed: Jul. 19, 2012

(65) Prior Publication Data  
US 2013/0021341 A1  Jan. 24, 2013

(30) Foreign Application Priority Data  
Jul. 19, 2011  (KR) ........................ 10-2011-0071548

(51) Int. Cl.  
G06T 17/00 (2006.01)  
G06K 9/46 (2006.01)  
G06T 19/00 (2011.01)  
G06T 7/00 (2006.01)  
G06T 3/40 (2006.01)

(52) U.S. Cl.  
CPC .............. G06T 19/00 (2013.01); G06T 3/4038 (2013.01); G06T 7/0028 (2013.01); G06T 2207/10136 (2013.01); G06T 2207/30044 (2013.01)

(58) Field of Classification Search  
CPC ................ G06T 19/00; G06T 2207/10136; G06T 2207/30044; G06T 3/4038; G06T 7/0028  
See application file for complete search history.

(56) References Cited

U.S. PATENT DOCUMENTS

| 7,033,320 B2 | 4/2006 | Von Behren et al. |
| 2006/0058651 A1* | 3/2006 | Chiao et al. .................. 600/437 |
| 2006/0228015 A1* | 10/2006 | Brockway et al. ............ 382/132 |

(Continued)

FOREIGN PATENT DOCUMENTS

| KR | 10-2003-0045839 A | 6/2003 |
| KR | 10-2008-0032612 A | 4/2008 |

(Continued)

OTHER PUBLICATIONS

Foley et al., "Computer Graphics: Principles and Practice", Jul. 1997, Addison-Wesley Publishing Company, Inc., Second Edition, Chapter 5.*

(Continued)

Primary Examiner — Sing-Wai Wu  
(74) Attorney, Agent, or Firm — NSIP Law

(57) ABSTRACT

A method and apparatus to generate a volume-panorama image based on three-dimensional (3D) volume images is provided. A method of generating a volume-panorama image includes receiving pieces of image data of one or more volume images, extracting partial regions including one or more voxels from the volume images, determining a global conversion function representing a relationship of a conversion between a second volume image of the volume images and a first volume image of the volume images, the determined global conversion function being based on a conversion function representing a relationship of a conversion between one of the extracted partial regions of the second volume image and one of the extracted partial regions of the first volume image, and generating image data of a volume image to be combined with the first volume image from image data of the second volume image based on the determined global conversion function.

21 Claims, 9 Drawing Sheets

(56) References Cited

U.S. PATENT DOCUMENTS

| | | | |
|---|---|---|---|
| 2006/0239571 A1* | 10/2006 | Dong et al. | 382/236 |
| 2008/0260258 A1* | 10/2008 | Wang et al. | 382/199 |
| 2010/0322491 A1* | 12/2010 | Long | 382/128 |

FOREIGN PATENT DOCUMENTS

| | | |
|---|---|---|
| KR | 10-2010-0025431 A | 3/2010 |
| KR | 10-2011-0018573 A | 2/2011 |

OTHER PUBLICATIONS

Matas, J., et al. "Robust Wide Baseline Stereo from Maximally Stable Extremal Regions." Proceeding from the 13$^{th}$ Annual British Machine Vision Conference, held on Sep. 2-5, 2002, at University of Cardiff: pp. 384-393.

Ni, Dong, et al. "Reconstruction of volumetric ultrasound panorama based on improved 3D SIFT." *Computerized Medical Imaging and Graphics* vol. 33 No. 7 (2009): pp. 559-566.

\* cited by examiner

METHOD AND APPARATUS TO GENERATE 3D VOLUME-PANORAMA IMAGE BASED ON 3D VOLUME IMAGES

CROSS-REFERENCE TO RELATED PATENT APPLICATIONS

This application claims the benefit of under 35 U.S.C. §119(a) of Korean Patent Application No. 10-2011-0071548, filed on Jul. 19, 2011, in the Korean Intellectual Property Office, the entire disclosure of which is incorporated herein by reference for all purposes.

BACKGROUND

1. Field

The following description relates to methods and apparatuses to generate a volume-panorama image based on volume images.

2. Description of Related Art

An ultrasonic imaging apparatus, a Computed Tomography (CT) apparatus, and a Magnetic Resonance Imaging (MRI) apparatus are examples of medical devices often used to generate a cross-sectional two-dimensional (2D) image of an inner portion of a target. These medical devices are used often in this capacity due to the relative convenience offered to a patient being scanned by these devices and the speed with which a result from the scan may be obtained. Ultrasonic imaging apparatuses transmit an ultrasonic signal toward a predetermined point of the inner portion of the target and obtain an image associated with the inner portion of the target based on information contained in an ultrasonic signal reflected by the inner portion of the target. As such, ultrasonic imaging apparatuses are relatively compact and inexpensive, capable of real-time display, and relatively safe as radiation exposure is not an issue.

Further, medical equipment has been developed that allows for the output of a three-dimensional (3D) image of the inner portion of the target. Moreover, methodology of creating a 3D panoramic image with respect to the inner portion of the target by synthesizing a plurality of 3D images has been developed to secure a larger observation region.

SUMMARY

In one general aspect, a method of generating a volume-panorama image includes receiving pieces of image data of one or more volume images, the pieces representing an observation area of an inner portion of a target in a 3D manner, extracting one or more partial regions including one or more voxels from the volume images, determining a global conversion function representing a relationship of a conversion between a second volume image of the volume images and a first volume image of the volume images, the determined global conversion function being based on a conversion function representing a relationship of a conversion between one of the extracted partial regions of the second volume image and one of the extracted partial regions of the first volume image, and generating image data of a volume image to be combined with the first volume image from image data of the second volume image based on the determined global conversion function.

The method may include that the determining of the global conversion function is based on a conversion function representing a relationship of a conversion between voxels corresponding to the one of the extracted partial regions of the second volume image partial region and voxels corresponding to the one of the extracted partial regions of the first volume image.

The method may include that the determining of the global conversion function is based on a conversion function representing a relationship of a conversion between a morphological characteristic of the one of the extracted partial regions of the second volume image and a morphological characteristic of the one of the extracted partial regions of the first volume image.

The method may include that the extracting of the partial regions includes extracting one of the partial regions from each of the volume images based on intensities of voxels that are included in each of the volume images, the extracted one of the partial regions including one or more of the voxels included in each of the volume images.

The method may include that the voxels of the extracted one of the partial regions have intensities that are similar among the voxels included in each of the volume images.

The method may include that the determining of the global conversion function includes selecting, from the one of the extracted partial regions of the second volume image, a second feature region corresponding to a first feature region selected from the one of the extracted partial regions of the first volume image and determining a global conversion function representing a relationship of a conversion between the second volume image and the first volume image, based on a conversion function representing a relationship of a conversion between the second feature region and the first feature region, the selecting of the second feature region including comparing the one of the extracted partial regions of the first volume image with the one of the extracted partial regions of the second volume image based on a morphological characteristic of the one of the extracted partial regions of the first volume image and a morphological characteristic of the one of the extracted partial regions of the second volume image.

The method may include that the second feature region is selected based on a similarity between the morphological characteristic of the one of the extracted partial regions of the first volume image and the morphological characteristic of the one of the extracted partial regions of the second volume image.

The method may include that the morphological characteristic of the one of the extracted partial regions of the first volume image and the morphological characteristic of the one of the extracted partial regions of the second volume image are determined based on a gradient between intensities of the voxels corresponding to the one of the extracted partial regions of the first volume image and the voxels corresponding to the one of the extracted partial regions of the second volume image.

The method may include that the determining of the global conversion function further includes converting the one of the extracted partial regions of the first volume image and the one of the extracted partial regions of the second volume image into respective spherical regions and determining the morphological characteristic of the one of the extracted partial regions of the first volume image and the morphological characteristic of the one of the extracted partial regions of the second volume image based on the respective spherical regions.

The method may include that the determining of the global conversion function further includes converting the one of the extracted partial regions of the first volume image and the one of the extracted partial regions of the second volume image into respective ellipsoidal regions, converting the respective ellipsoidal regions into respective spherical regions, normalizing the respective spherical regions into respective normalized spherical regions, and determining the morphological characteristic of the one of the extracted partial regions of the first volume image and the morphological characteristic of the one of the extracted partial regions of the second volume image based on intensities of voxels corresponding to the respective normalized spherical regions.

The method may include that the determining of the global conversion function includes determining one or more parameters that normalizes the one of the extracted partial regions of the first volume image and the one of the extracted partial regions of the second volume image into respective spherical regions and determining the conversion function representing the relationship of the conversion between the one of the extracted partial regions of the second volume image and the one of the extracted partial regions of the first volume image based on the determined parameters.

The method may include that the determined parameters include one or more parameters representing a location change of voxels corresponding to the one of the extracted partial regions of the second volume image and the one of the extracted partial regions of the first volume image and one or more parameters representing an orientation transformation of the voxels corresponding to the one of the extracted partial regions of the second volume image and the one of the extracted partial regions of the first volume image.

The method may include that the parameters include a first parameter that normalizes the one of the extracted partial regions of the first volume image into a spherical region and a second parameter that normalizes the one of the extracted partial regions of the second volume image into a spherical region.

The method may include that the generating of the image data includes generating the image data of the volume image to be combined with the first volume image based on the global conversion function, determining a local conversion function based on one or more local volume images into which the volume image to be combined with the first volume image is split, and updating the image data of the volume image to be combined with the first volume image based on the determined local conversion function.

The method may include generating image data of the volume-panorama image, including combining the image data of the first volume image with the generated image data of the volume image to be combined with the first volume image.

The method may include that the generating of the image data of the volume-panorama image includes determining an intensity of one or more voxels of the volume-panorama image based on an intensity of the voxels of the first volume image and an intensity of one or more voxels of the volume image to be combined with the first volume image.

In another general aspect, there is provided a non-transitory computer-readable recording medium having recorded thereon a program for executing a method of generating a volume-panorama image.

In yet another general aspect, a method of generating a volume-panorama image includes receiving pieces of image data of one or more volume images, the pieces of the image data representing an observation area of an inner portion of a target in a 3D manner, extracting one or more partial regions including one or more voxels from the volume images, determining a conversion function representing a conversion of one of the extracted partial regions of a second volume image of the volume images into one of the extracted partial regions of a first volume image of the volume images, determining a global conversion function representing a conversion of the second volume image into the first volume image from the determined conversion function, and generating the volume-panorama image from the pieces based on the determined global conversion function.

In still another general aspect, an apparatus to generate a volume-panorama image includes an input unit configured to receive pieces of image data of one or more volume images, the pieces representing an observation area of an inner portion of a target in a 3D manner, an image processor configured to extract one or more partial regions from the volume images, determine a global conversion function between the volume images based on a conversion function between the extracted partial regions, and generate the volume-panorama image by combining the volume images based on the global conversion function, and an output unit configured to output the volume-panorama image.

The apparatus may include that the image processor includes a partial region extraction unit, a conversion function determination unit, a combination image data generation unit, and an image data combination unit, the partial region extraction unit being configured to extract the partial regions from the volume images, the partial regions including one or more voxels, the conversion function determination unit being configured to determine the global conversion function, the determined global conversion function representing a relationship of a conversion between a second volume image of the volume images and a first volume image of the volume images and being based on the conversion function, the conversion function representing a relationship of a conversion between one of the extracted partial regions of the second volume image and one of the extracted partial regions of the first volume image, the combination image data generation unit being configured to generate image data of a volume image to be combined with the first volume image from image data of the second volume image according to the global conversion function, the image data combination unit being configured to generate image data of the volume-panorama image by combining the image data of the first volume image with the generated image data of the volume image to be combined with the first volume image.

Other features and aspects may be apparent from the following detailed description, the drawings, and the claims.

Figure 1:
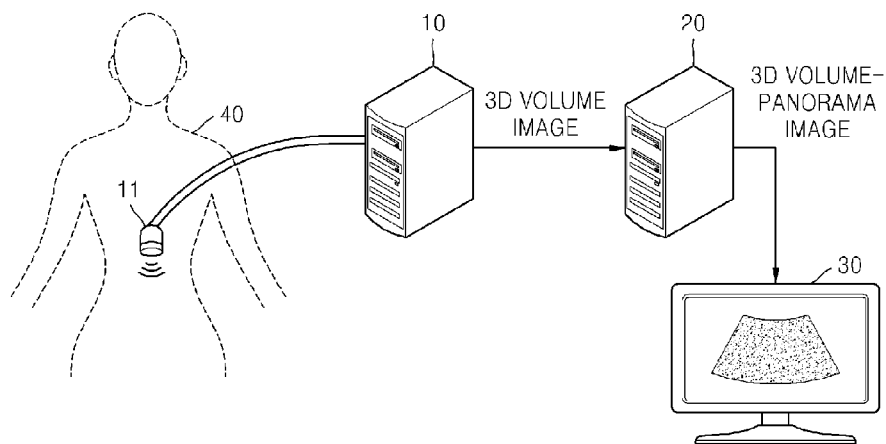
FIG. 1 is a diagram illustrating an example of a medical imaging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating an example of a medical imaging system. Referring to FIG. 1, the example of the medical diagnosing system includes a 3-dimensional (3D) volume image generating apparatus 10, a volume-panorama image generating apparatus 20, and an image display 30.

The 3D volume image generating apparatus 10 generates image data of volume images to represent an observation area of an inner portion of a target 40 in a 3D manner. In this example, the 3D volume image generating apparatus 10 includes a probe 11 that generates a source signal based on the inner portion of the target 40. Here, the source signal may be an ultrasound signal, an X-ray signal, or any other signal known to one of ordinary skill in the art that may be generated based on the inner portion of a target.

Examples of the 3D volume image generating apparatus 10 may include an ultrasonic imaging apparatus, a Computed Tomography (CT) apparatus, a Magnetic Resonance Imaging (MRI) apparatus, or any other medical equipment apparatus known to one of ordinary skill in the art to generate an image of an inner portion of a target, and are not limited to the examples illustrated herein.

In an example in which the 3D volume image generating apparatus 10 is an ultrasonic diagnosing apparatus, the 3D volume image generating apparatus 10 generates image data of volume images to represent an observation area of an inner portion of the target 40 in a 3D manner to a medical expert, such as a doctor or any other individual known to one of ordinary skill in the art having a desire to view the observation area for diagnosis purposes. The 3D volume image generating apparatus 10 generates the image data based on a reaction signal generated by delivering a source signal generated from the probe 11 to the observation area of the inner portion of the target 40.

The probe 11 of the 3D volume image generating apparatus 10 of this example is generally an array of one or more transducers. When an ultrasonic signal is delivered from the probe 11 of the 3D volume image generating apparatus 10 to the observation area of the inner portion of the target 40, the ultrasonic signal is partially reflected by layers between various different tissues. For example, the ultrasonic signal is reflected from an area in the inner portion of the target 40 having a density change, such as blood cells in blood plasma and small structures in organs. The reflected ultrasonic signals vibrate the transducers of the probe 11. As a result, the transducers of the probe 11 output electrical pulses based on the vibrations of the reflected ultrasonic signals. These electrical pulses may be converted into a 3D volume image.

The 3D volume image generating apparatus 10 produces a 3D volume image of the inner portion of the target 40 while changing a location and orientation of the probe 11 over the target 40. For example, the 3D volume image generating apparatus 10 generates one or more cross-sectional images of the inner portion of the target 40 by delivering one or more ultrasonic signals to the observation area of the inner portion of the target 40 on a number of occasions. The 3D volume image generating apparatus 10 generates image data of a 3D volume image to represent the observation area of the inner portion of the target 40 in a 3D manner by stacking these cross-sectional images.

Image data of a 3D volume image may be generated based on a Multiplanar Reconstruction (MPR) method or any other method of generating a 3D volume image known to one of ordinary skill in the art. For example, image data of a 3D volume image may be generated according to a method in which a 3D reception signal, including position data of an x axis, a y axis, and a z axis, is received by the transducers of the probe 11 and image data of 3D volume images is thereby generated from the 3D reception signal.

The field of view of image data of a 3D volume image denotes an ultrasonic image that is obtained from a predetermined area on the target 40 on which the probe 11 is placed, without changing the location of the probe 11. The predetermine area on the target 40 on which the probe 11 is placed may be, but is not limited to, the skin of the target 40. Image data of a 3D volume image may correspond to the field of view afforded by the 3D volume image generating apparatus 10. For example, a size of a field of view of image data of a 3D volume image generated by an example of the 3D volume image generating apparatus 10 utilizing reflected ultrasonic signals may be dependent upon a type of a probe used, a configuration of transducers of the probe, the number of transducers of the probe, or any other variables known to one of ordinary skill in the art to be introduced as a result of ultrasonic measurement.

In this example, when the 3D volume image generating apparatus 10 observes an observation area at a depth of about 15 cm from the predetermined area of the target 40 and a viewing angle in a range of 60° to 100° degrees at one moment, the 3D volume image output from the 3D volume image generating apparatus 10 may observe organs of the target 40, an entire fetus in the target 40, or any other similar area of a target 40 known to one of ordinary skill in the art at one time.

A field of view may be widened by combining one or more sequentially obtained 3D volume images to generate a volume-panorama image. To combine the 3D volume images, a feature region serving as a base for the combination of the images is determined from the 3D volume images. The feature region may be appropriately used to efficiently combine 3D volume images acquired from different observation areas.

Figure 2:
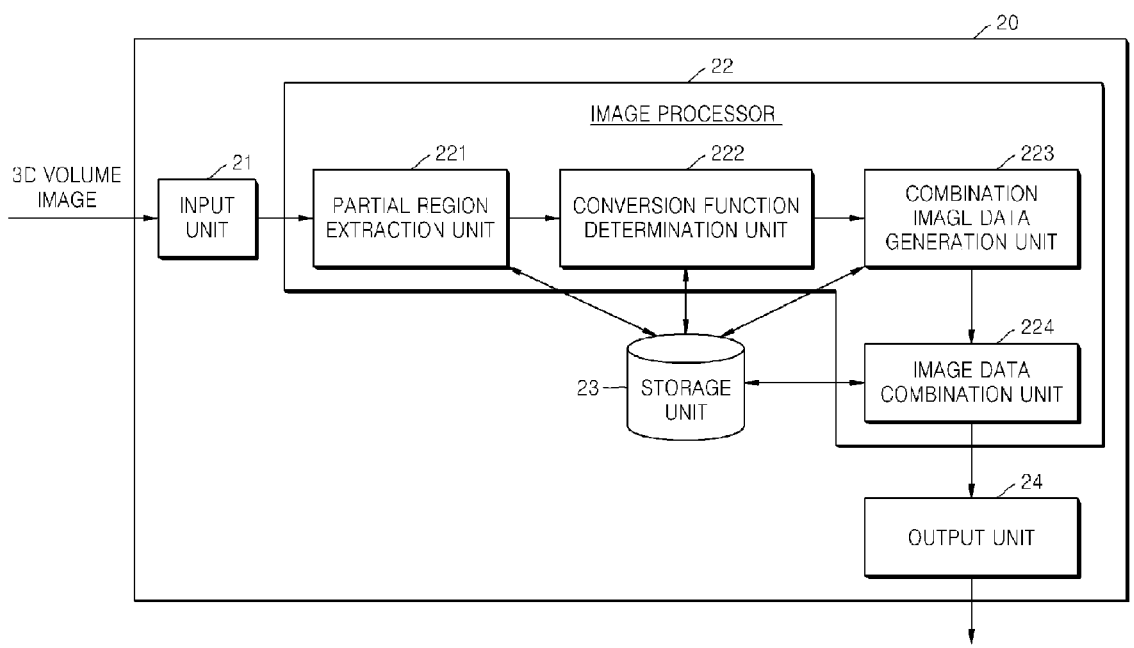
FIG. 2 is a block diagram illustrating an example of a three-dimensional (3D) volume-panorama image generating apparatus of an example of a medical imaging system illustrated in FIG. 1.

FIG. 2 is a block diagram illustrating an example of a three-dimensional (3D) volume-panorama image generating apparatus of an example of a medical imaging system illustrated in FIG. 1. Referring to FIG. 2, an example of the volume-panorama image generating apparatus 20 includes an input unit 21, an image processor 22, a storage unit 23, and an output unit 24. The volume-panorama image generating apparatus 20 may further include a user interface, but is not limited thereto. The user interface may be an interface to receive a command or information from a medical expert, such as a doctor or any other individual known to one of ordinary skill in the art having a desire to use the apparatus. The user interface may be generally an input device, such as a keyboard or a mouse, but is not limited thereto and may also be a Graphical User Interface (GUI) displayed on the image display 30 of the example of the medical imaging system illustrated in FIG. 1.

The input unit 21 receives the image data of the 3D volume image from the 3D volume image generating apparatus 10. The 3D volume image shows an observation area of the inner portion of the target 40 in a 3D manner. For example, the input unit 21 receives pieces of image data of one or more 3D volume images from the 3D volume image generating apparatus 10.

The 3D volume images have different observation areas of the inner portion of the target 40. For example, one of the volume images may have an observation area corresponding to a head of a fetus in the target 40. Another one of the volume images may have an observation area corresponding to a body part of the fetus in the target 40.

The input unit 21 transmits the pieces of image data of the volume images received from the 3D volume image generating apparatus 10 to the image processor 22. The output unit 24 outputs to the image display 30 image data of the volume-panorama image obtained by combining the image data of the volume-panorama images by the image processor 22. The input unit 21 and the output unit 24 are an interface to connect the image processor 22 to the 3D volume image generating apparatus 10 and an interface to connect the image processor 22 to the image display 30, respectively.

The image processor 22 includes a partial region extraction unit 221, a conversion function determination unit 222, a combination image data generation unit 223, and an image data combination unit 224. The image processor 22 may be manufactured with chips exclusively performing functions of the components listed above or implemented using a universal central processing unit (CPU) and an exclusive program stored in the storage unit 23. The image processor 22 generates the image data of the volume-panorama image based on the pieces of the image data of the volume images received by the input unit 21. The volume-panorama image has a field of view that is wider than a field of view of the volume images.

The image display 30 displays the volume-panorama image based on the image data of the volume-panorama image received from the output unit 24. Examples of the image display 30 include a device to display a volume-panorama image on a screen, a sheet of paper, or any other medium known to one of ordinary skill in the art to display images.

The storage unit 23 stores a variety of pieces of data that are generated during image processing performed in the image processor 22. For example, the storage unit 23 stores the pieces of image data of the volume images received from the input unit 21 and the image data of the volume-panorama image that is to be transmitted to the output unit 24. As another example, the storage unit 23 stores data identifying partial regions, feature regions, and any other region of the volume images known to one of ordinary skill in the art. Examples of the storage unit 23 include a hard disk drive, a read only memory (ROM), a random access memory (RAM), a flash memory, a memory card, or any other storage medium known to one of ordinary skill in the art.

Figure 3:
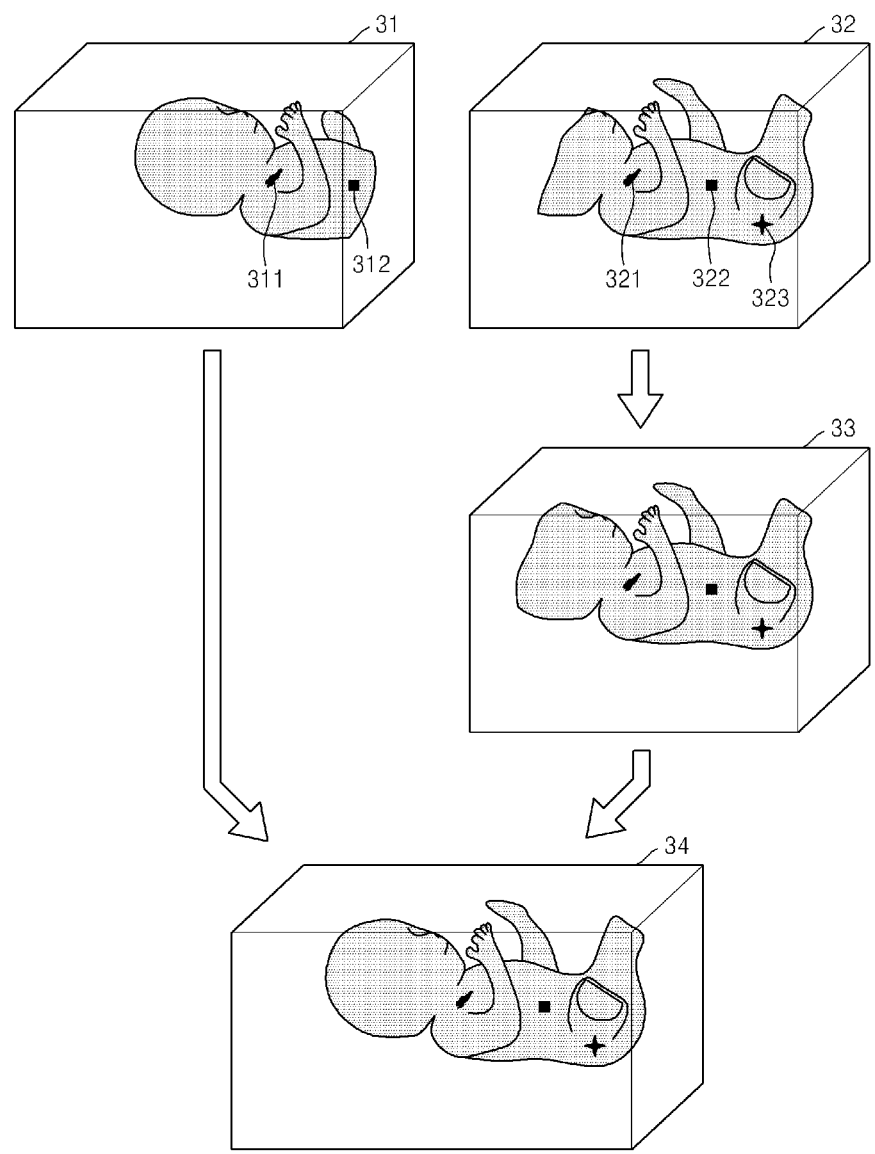
FIG. 3 is a diagram illustrating an example of generation of a volume-panorama image from a plurality of volume images in an image processor included in the example illustrated in FIG. 2.

FIG. 3 is a diagram illustrating an example of generation of a volume-panorama image from one or more volume images in an image processor 22 included in the example illustrated in FIG. 2. Referring to the example illustrated in FIG. 3, the image processor 22 extracts a partial region 311 from a first volume image 31 of the volume images, based on intensities of voxels included in the first volume image 31. In this example, the partial region 311 denotes a first feature region corresponding to a partial region 321 extracted from a second volume image 32 of the volume images. The image processor 22 extracts the second partial region 321 from the second volume image 32 based on intensities of voxels included in the second volume image 32. In this example, the partial region 321 denotes a second feature region corresponding to the partial region 311 extracted from the first volume image 31.

Referring to the example illustrated in FIG. 3, the image processor 22 determines a global conversion function representing a relationship of a conversion between the second volume image 32 and the first volume image 31 based on a conversion function representing a relationship of a conversion between the partial region 321 of the second volume image 32 and the partial region 311 of the first volume image 31. The conversion function between the partial region 311 of the first volume image 31 and the partial region 321 of the second volume image 32 denotes a conversion function of the partial region 321 of the second volume image 32 to match the partial region 321 of the second volume image 32 to the partial region 311 of the first volume image 31. The global conversion function between the first volume image 31 and the second volume image 32 denotes a conversion function of the second volume image 32 to match the second volume image 32 to the first volume image 31. For example, a global conversion function between volume images may be determined based on a conversion function determination unit 222 included in the image processor 22 by extending a conversion function between partial regions.

Referring to the example illustrated in FIG. 3, the image processor 22 generates image data of a volume image 33, which is to be combined with the first volume image 31 to generate image data of a volume-panorama image 34, from image data of the second volume image 32 according to the global conversion function. The volume image 33 denotes a volume image obtained by reflecting an inverse conversion function in the second volume image 32. For example, the volume image 33 denotes an image obtained by matching the second volume image 32 to the first volume image 31. The image processor 22 generates image data of a volume-panorama image 34 by combining the image data of the volume image 33 with the image data of the first volume image 31.

Figure 4:
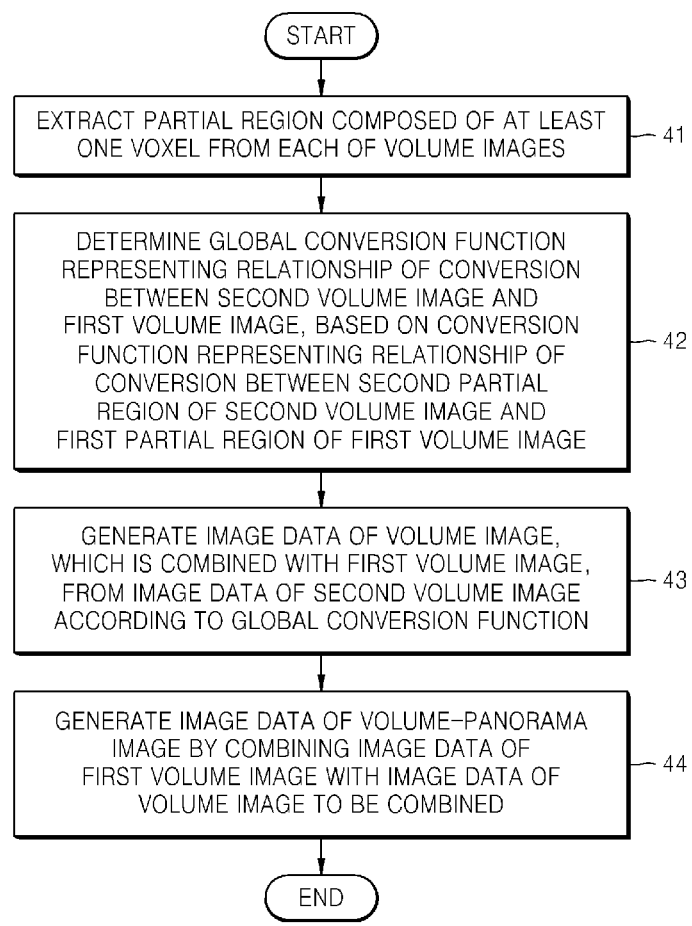
FIG. 4 is a flowchart illustrating an example of a process of generating image data of a volume-panorama image.

FIG. 4 is a flowchart illustrating an example of a process of generating image data of a volume-panorama image. In the example described herein, this process is performed by the partial region extraction unit 221, the conversion function determination unit 222, the combination image data generation unit 223, and the image data combination unit 224 of the image processor 22.

The partial region extraction unit 221 extracts (41) one or more partial regions from one or more volume images based on image data of the volume images. In this example, the partial region extraction unit 221 extracts one or more partial regions from a first volume image based on image data of the first volume image and one or more partial regions from a second volume image based on image data of the second volume image.

In an example, a partial region denotes a predetermined region that is included in each of the volume images and is composed of one or more voxels. In another example, the partial region denotes a region composed of one of the voxels included in each of the volume images. In general, the partial region is displayed in a 3D manner. However, the display is not limited thereto. For example, the partial region may be displayed in a 2D manner.

One or more voxels are included in the partial region. For example, the partial region may denote a 3D region composed of twenty of the voxels included in each of the volume images. The partial region may also be referred to as a 3D volume segment composed of one or more voxels. In an example, the partial region extraction unit 221 extracts corresponding regions of the volume images by extracting partial regions of the volume regions that are each composed of a one or more voxels and comparing morphological characteristics of the extracted partial regions.

Generally, the partial region extraction unit 221 extracts one or more partial regions from each of the volume images based on intensities of the voxels of each of the volume images. For example, the partial region extraction unit 221 extracts the partial region from the first volume image, based on intensities of the voxels of the first volume image. In this example, the partial region extraction unit 221 compares the intensities of the voxels included in the first volume image, determines voxels having similar intensities from the voxels included in the first volume image, and extracts a predetermined region composed of the determined voxels to serve as the partial region of the first volume image. The voxels having similar intensities may denote a collection of voxels within a predetermined range. For example, the voxels that are part of the partial region of the first volume image may be voxels having intensities in a range of 80 to 120.

The extracting of the voxels with similar intensities includes a method that uses maximally stable extremal regions (J. Matas et al., "Robust wide baseline stereo from maximally stable extremal regions," BMVC 2002) in a 3D manner. However, the extracting of the voxels with similar intensities is not limited thereto. For example, according to various examples, the partial region extraction unit 221 extracts a collection of voxels having similar intensities from the voxels included in the first volume image by arbitrarily determining one voxel from among the voxels included in the first volume image and comparing intensities of neighboring voxels of the determined voxel. In another example, the partial region extraction unit 221 extracts the collection of voxels having similar intensities based on the location and intensity of each of the voxels included in the first volume image.

In one example, the partial region is composed of one voxel. In this case, the partial region extraction unit 221 compares the voxels included in the first volume image and determines one voxel from among the voxels to be the partial region of the first volume image. For example, the partial region extraction unit 221 compares the voxels included in the first volume image and determines one voxel having an intensity that is the greatest from among the voxels as the partial region of the first volume image.

The conversion function determination unit 222 determines (42) a global conversion function between the volume images, based on a conversion function between the partial regions of the volume images. For example, the conversion function determination unit 222 determines the global conversion function between the first and second volume images, based on the conversion function between the partial region of the first volume image of the volume images and the partial region of the second volume image of the volume images. The conversion function between the partial region of the first volume image and the partial region of the second volume image denotes a representation of a relationship of a conversion between a morphological characteristic of the partial region of the second volume image and that of the partial region of the first volume image.

The global conversion function between the first volume image and the second volume image denotes a representation of a relationship of a conversion between a morphological characteristic of the second volume image and that of the first volume image. Accordingly, in an example, the conversion function determination unit 222 determines a global conversion function between volume images by extending a conversion function between partial regions.

The conversion function between the partial regions generally denotes a conversion function between voxels respectively corresponding to the partial regions. In an example, the conversion function between the partial region of the first volume image and the partial region of the second volume image denotes a conversion function between voxels corresponding to the partial region of the second volume image and voxels corresponding to the partial region of the first volume image. The conversion function between the voxels corresponding to the partial region of the first volume image and the voxels corresponding to the partial region of the second volume image denotes a conversion function of the voxels corresponding to the partial region of the second volume image to match the voxels corresponding to the partial region of the second volume image to the voxels corresponding to the partial region of the first volume image. In an example, the voxels corresponding to the partial region of the first volume image denote voxels included in the partial region of the first volume image, or the voxels corresponding to the partial region of the first volume image and voxels around the partial region of the first volume image. Similarly, in an example, the voxels corresponding to the partial region of the second volume image denote voxels included in the partial region of the second volume image, or the voxels corresponding to the partial region of the second volume image and voxels around the partial region of the second volume image.

The global conversion function between the volume images generally denotes a conversion function between voxels respectively corresponding to the volume images. In an example, the conversion function between the first volume image and the second volume image denotes a conversion function between voxels corresponding to the second volume image and voxels corresponding to the first volume image. The conversion function between the voxels corresponding to the first volume image and the voxels corresponding to the second volume image denotes a conversion function of the voxels corresponding to the second volume image to match the voxels corresponding to the second volume image to the voxels corresponding to the first volume image. In an example, the voxels corresponding to the first volume image denote the voxels included in the first volume image. Similarly, in an example, the voxels corresponding to the second volume image denote the voxels included in the second volume image. However, the examples are not limited thereto. In another example, the voxels corresponding to the first volume image denote only voxels having intensities equal to or greater than a critical value from among the voxels included in the first volume image.

Figure 5:
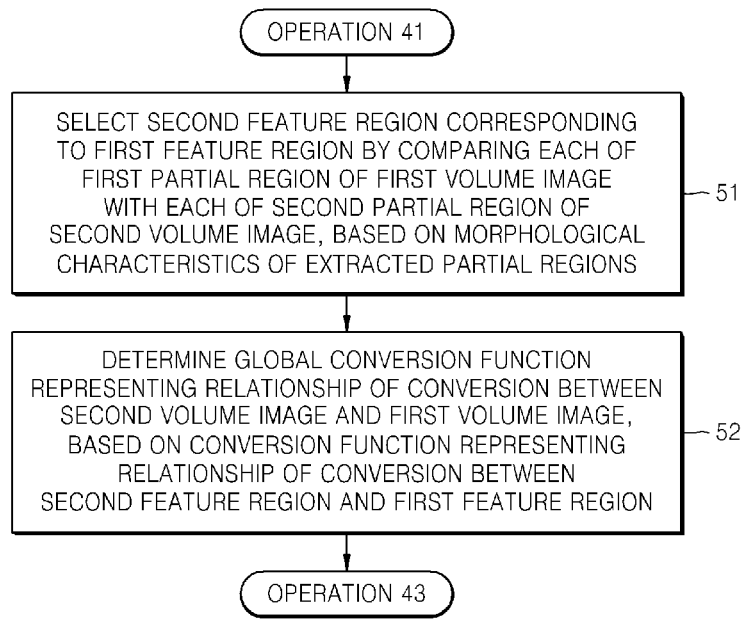
FIG. 5 is a flowchart illustrating an example of determining a global conversion function in a process of generating image data of a volume-panorama image.

FIG. 5 is a flowchart illustrating an example of determining a global conversion function in a process of generating image data of a volume-panorama image. Referring to the example illustrated in FIG. 5, the conversion function determination unit 222 compares partial regions respectively extracted from different volume images and extracts corresponding feature regions from the partial regions. In an example, the feature regions denote partial regions selected from the partial regions extracted from the different volume images.

In general, the conversion function determination unit 222 selects the feature regions based on the morphological characteristics of the partial regions extracted from the different volume images. In other words, the conversion function determination unit 222 selects, as the feature regions, partial regions having similar morphological characteristics from among the partial regions extracted from the different volume images.

In an example, the conversion function determination unit 222 extracts one or more partial regions from the first volume image and one or more partial regions from the second volume image, compares the morphological characteristics of the partial regions of the first volume image with those of the partial regions of the second volume image, thereby selecting one of the partial regions of the first volume image, selects one of the partial regions of the second volume image corresponding to the selected one of the partial regions of the first volume image, and determines the selected of the partial regions of the first volume image and the selected one of the partial regions of the second volume image as the first feature region and the second feature region, respectively. In other words, in an example, the conversion function determination unit 222 selects (51) the second feature region corresponding to the first feature region by comparing each of the partial regions of the first volume image with each of the partial regions of the second volume image based on morphological characteristics of the extracted partial regions of the first volume image and partial regions of the second volume image.

A morphological characteristic is generally determined based on a gradient between the intensities of the voxels included in the extracted partial regions. The conversion function determination unit 222 determines the morphological characteristics of the extracted partial regions based on a gradient between the intensities of the voxels of the partial regions extracted from the different volume images and determines the feature regions based on the determined morphological characteristics. For example, the conversion function determination unit 222 determines the morphological characteristic of each of the partial regions extracted from the first volume image, determines the morphological characteristic of each of the partial regions extracted from the second volume image, and selects the first feature region from the partial regions of the first volume image and the second feature region from the partial regions of the second volume image based on the determined morphological characteristics.

In an example, the conversion function determination unit 222 normalizes each of the partial regions extracted from the different volume images into a spherical region and determines the morphological characteristics of the partial regions based on the normalized spherical regions. Referring to FIG. 3, the conversion function determination unit 222 extracts the partial regions 311 and 312 from the first volume image 31 and the partial regions 321, 322, and 323 from the second volume image 32, normalizes the extracted partial regions 311 and 312 of the first volume image 31 and the extracted partial regions 321, 322, and 323 of the second volume image into spherical regions, and determines the respective morphological characteristics of the normalized partial regions 311 and 312 of the first volume image and the respective morphological characteristics of the normalized partial regions 321, 322, and 323 of the second volume image based on the normalized spherical regions. The conversion function determination unit 222 of an example compares the morphological characteristics of the partial regions 311 and 312 extracted from the first volume image 31 with those of the partial regions 321, 322, and 323 extracted from the second volume image 32, and selects one or more first feature regions from the extracted partial regions 311 and 312 of the first volume image and one or more second feature regions from the extracted partial regions 321, 322, and 323 of the second volume image. In the example illustrated in FIG. 5, the first feature region is determined to be the partial region 311 of the first volume image and the partial region 312 of the first volume image, and the second feature region is determined to be the partial region 321 of the second volume image and the partial region 322 of the second volume image.

Figure 6:
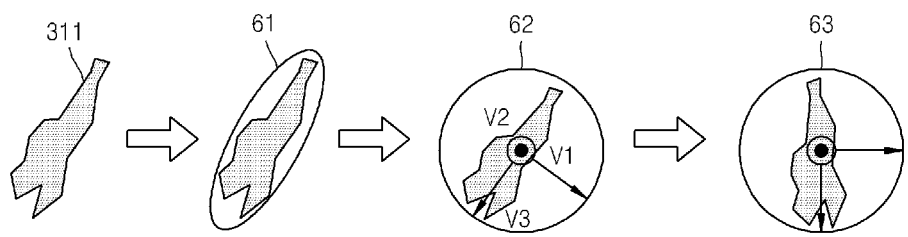
FIG. 6 is a diagram illustrating an example of a process of determining a morphological characteristic of a first partial region based on the example illustrated in FIG. 3.

FIG. 6 is a diagram illustrating an example of a process of determining a morphological characteristic of a first partial region 311 based on the example illustrated in FIG. 3. In an example, the conversion function determination unit 222 converts each of the extracted partial regions into an ellipsoidal region, normalizes the ellipsoidal regions into spherical regions, and determines the morphological characteristics of the partial regions based on the normalized spherical regions. Referring to the examples illustrated in FIGS. 3 and 6, the conversion function determination unit 222 converts the partial region 311 extracted from the first volume image 31 into an ellipsoidal region 61, converts the ellipsoidal region 61 into a spherical region 62, and converts the spherical region 62 into a normalized spherical region 63 by normalizing the spherical region 62. In this example, the conversion function determination unit 222 determines the morphological characteristic of the partial region 311 of the first volume image 31 based on the normalized spherical region 63.

Referring further to the examples illustrated in FIGS. 3 and 6, the conversion function determination unit 222 converts the partial region 311 of the first volume image 31 into the ellipsoidal region 61. In an example, the conversion function determination unit 222 determines one of the voxels included in the partial region 311 of the first volume image 31 to be a central voxel of the ellipsoidal region 61, and defines the ellipsoidal region 61 based on the determined central voxel. In an example, the conversion function determination unit 222 defines the ellipsoidal region 61 with respect to voxels x corresponding to the partial region 311 of the first volume image 31, as in Equation 1.

$$(x-c)^T \Sigma^{-1} (x-c) = r^2 \qquad \text{[Equation 1]}$$

In this example, the voxels corresponding to the partial region 311 of the first volume image 31 denote voxels included in the partial region 311 of the first volume image 31, or the voxels included in the partial region 311 of the first volume image 31 and voxels around the partial region 311 of the first volume image 31, as described above. In Equation 1, c denotes a central voxel selected from among the voxels included in the ellipsoidal region 62, $\Sigma$ denotes a covariance matrix, and r denotes a constant proportional to the size of the ellipsoidal region 62. The covariance matrix is also referred to as a dispersion matrix, and an element of a covariance matrix specified by positions i and j denotes a matrix representing a correlation between i-th and j-th elements of a random vector.

Referring to further to the examples illustrated in FIGS. 3 and 6, the conversion function determination unit 222 converts the ellipsoidal region 61 into the spherical region 62.

Like the above-described ellipsoidal region 61, the spherical region 62 is defined with respect to the voxels x corresponding to the partial region 311 of the first volume image 31, as in Equation 2.

$$y^T y = r^2$$

$$y = \Sigma^{-T/2}(x-c) \quad \text{[Equation 2]}$$

For example, the conversion function determination unit 222 decomposes the spherical region 62 to $\Sigma^{-1/2} \Sigma^{-T/2}$, since $\Sigma^{-1}$, which is the inverse matrix of the covariance matrix included in Equation 1, is a positive definite symmetric matrix. Then, the conversion function determination unit 222 defines $\Sigma^{-1/2} \Sigma^{-T/2}$ with respect to the voxels x corresponding to the partial region 311 of the first volume image 31, as in Equation 2.

Referring further to the examples illustrated in FIGS. 3 and 6, the conversion function determination unit 222 converts the spherical region 62 into the normalized spherical region 63 by normalizing the spherical region 62. The normalized spherical region 63 is defined by three vector components that cross at right angles about the central voxel of the spherical region 62. For example, the conversion function determination unit 222 defines the normalized spherical region 63 with respect to the voxels x corresponding to the partial region 311 of the first volume image 31 as in Equation 3, by applying a rotation matrix R to Equation 2.

$$y^T y = r^2$$

$$y = R\Sigma^{-T/2}(x-c) \quad \text{[Equation 3]}$$

Referring further to the examples illustrated in FIGS. 3 and 6, the conversion function determination unit 222 converts the voxels corresponding to the partial region 311 of the first volume image 31 based on Equation 4 and determines the rotation matrix R based on the intensities of voxels obtained by converting the voxels corresponding to the partial region 311 of the first volume image 31 based on Equation 4.

$$y' = \Sigma^{-T/2}(x-c) \quad \text{[Equation 4]}$$

The rotation matrix R includes, as elements, three vector components that generally constitute three dimensions. Accordingly, in this example, to determine the three vector components, the conversion function determination unit 222 converts the voxels corresponding to the partial region 311 of the first volume image 31 based on Equation 4 and sequentially detects directions having large gradients of the intensities of the voxels obtained by converting the voxels corresponding to the partial region 311 of the first volume image 31 based on Equation 4. As an example, the conversion function determination unit 222 determines the rotation matrix R by warping the voxels corresponding to the partial region 311 of the first volume image 31, creates a histogram of gradient directions based on a weight proportional to a magnitude of a gradient of the intensities of the voxels, determines a gradient direction having a highest frequency to be vector $v_1$, determines a gradient direction having a high frequency from among the two gradient directions crossing the vector $v_1$ at a right angle to be vector $v_2$, and determines a gradient direction crossing both the vectors $v_1$ and $v_2$ at right angles to be vector $v_3$. Equation 5 represents the rotation matrix R of Equation 3.

$$R = \begin{bmatrix} v_1^T \\ v_2^T \\ v_3^T \end{bmatrix} \quad \text{[Equation 5]}$$

Referring further to the examples illustrated in FIGS. 3 and 6, the conversion function determination unit 222 determines the morphological characteristic of the partial region 311 of the first volume image 31 based on the normalized spherical region 63. Here, the conversion function determination unit 222 converts the voxels corresponding to the partial region 311 of the first volume image 31 based on Equation 3, generates an indicator representing an intensity gradient of each area of the normalized spherical region 63 based on the intensities of voxels obtained by converting the voxels corresponding to the partial region 311 of the first volume image 31 based on Equation 3, and determines a morphological characteristic obtained by aggregating the indicators into a vector. In this example, a morphological characteristic is represented as an invariant feature descriptor. Examples of the indicator representing a gradient include an intensity gradient orientation histogram.

Figure 7:
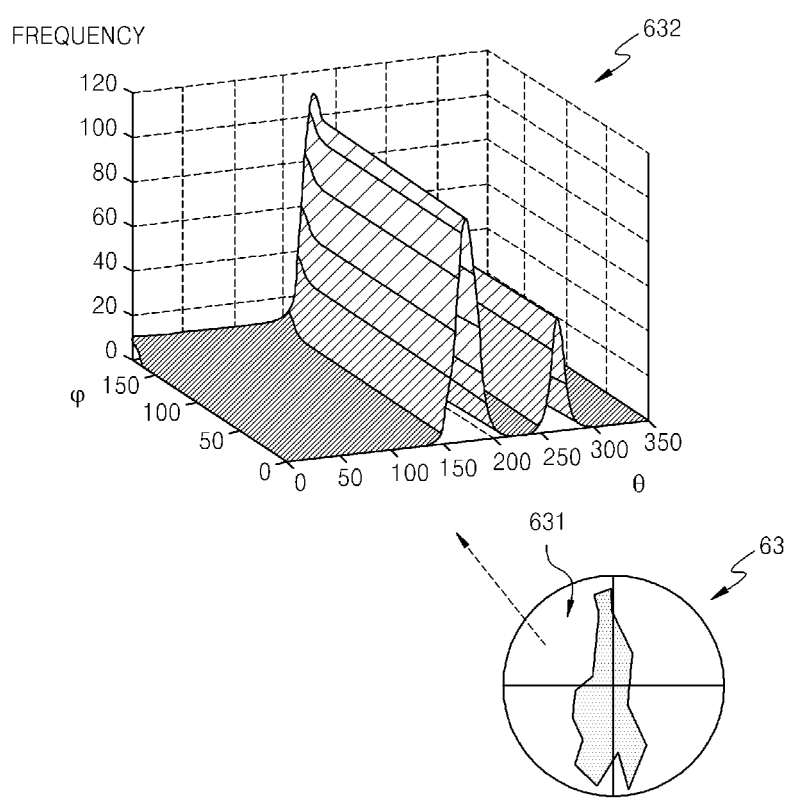
FIG. 7 is a diagram illustrating an example of an indicator representing a gradient of intensities of voxels included in one area of a normalized spherical region of the example illustrated in FIG. 6.

FIG. 7 is a diagram illustrating an example of an indicator representing a gradient of intensities of voxels included in one area of the normalized spherical region 63 of the example illustrated in FIG. 6. Referring to the examples illustrated in FIGS. 3, 6, and 7, the conversion function determination unit 222 generates an indicator 632 representing a gradient of the intensities of the voxels included in an area 631 of the normalized spherical region 63 from among the voxels corresponding to the partial region 311 of the first volume image 31. In an example, the conversion function determination unit 222 generates an indicator representing a gradient of the intensities of the voxels included in other areas of the normalized spherical region 63 and determines a morphological characteristic for the partial region 311 of the first volume image 31 based on the generated indicators.

Referring back to the selection of the second feature region corresponding to the first feature region in the example illustrated in FIG. 5, the conversion function determination unit 222 determines the first feature region and the second feature region by comparing the morphological characteristic of each of the partial regions of the first volume image 31 with that of each of the partial regions of the second volume image 32. In an example, referring to the example illustrated in FIG. 3, the conversion function determination unit 222 compares the morphological characteristics of the partial regions 311 and 312 extracted from the first volume image 31 with those of the partial regions 321, 322, and 323 extracted from the second volume image 32 and selects one or more first feature regions from the partial regions 311 and 312 of the first volume image 31 and one or more feature regions from the partial regions 321, 322, and 323 of the second volume image 32. In the example illustrated in FIG. 3, the first feature region is determined to be the partial region 311 of the first volume image 31 and the partial region 312 of the first volume image 31, and the second feature region is determined to be the partial region 321 of the second volume image 32 and the partial region 322 of the second volume image 32.

In general, the conversion function determination unit 222 selects the first feature region from the partial regions of the first volume image 31 and the second feature region from the partial regions of the second volume image 32, based on the similarity between the morphological characteristics of the first and second feature regions. As described above, such morphological characteristics may be represented as an invariant feature descriptor. The indicator 632 of FIG. 7 is an example of a morphological characteristic obtained by aggregating, into a vector, indicators representing the degrees to which the intensities of the voxels of respective areas of the normalized spherical region 63 change.

In another example, such a morphological characteristic is determined based on a gradient between the intensities of the voxels corresponding to each of the extracted partial regions, a size of each of the extracted partial regions, a magnitude of each of the intensities of the voxels included in each of the extracted partial regions, or any combination thereof. In this example, the size of each of the extracted partial regions denotes the number of voxels included in each of the extracted partial regions, as there is similarity between the intensities of the voxels included in one of the partial regions and the intensities of the voxels included in another of the partial regions. In this instance, when a mean of the intensities of the voxels included in one of the partial regions and a mean of the intensities of the voxels included in another of the partial regions are the same as each other or similar to each other within a predetermined range, it may be determined that there is a similarity between the two partial regions. As such, the morphological characteristics may be determined by considering the gradient between the intensities of the voxels corresponding to each of the extracted partial regions.

Referring further to the example illustrated in FIG. 5, the conversion function determination unit 222 determines (52) a global conversion function between the first and second volume images, based on a conversion function between the first and second feature regions. The conversion function between the partial regions of the first volume image 31 and the partial regions of the second volume image 32 denotes a conversion function of the second feature region to match the second feature region to the first feature region. The global conversion function between the first and second volume images denotes a conversion function of the second volume image to match the second volume image to the first volume image. In other words, the conversion function determination unit 222 determines a global conversion function between volume images by extending a conversion function between feature regions. Since the first feature region is one of the partial regions of the first volume image 31 and the second feature region is one of the partial regions of the second volume image 32, non-described matters of the first feature region, the second feature region, the first volume image, and the second volume image may refer to the description given above with respect to the partial regions of the first volume image 31 and the partial regions of the second volume image 32.

In the determination of the global conversion function in the example illustrated in FIG. 5, the conversion function determination unit 222 determines one or more parameters to convert each of the extracted feature regions into a spherical region, determines the conversion function between the first and second feature regions based on the determined parameters, and determines (52) the global conversion function between the first and second volume images based on the determined conversion function between the first and second feature regions.

In general, the conversion of each of the extracted feature regions into the spherical region denotes normalization of each of the extracted feature regions into a spherical region. As described above, in an example, the normalization of each of the extracted feature regions into a spherical region denotes a conversion of each of the feature regions into an ellipsoidal region, a conversion of the ellipsoidal region into a spherical region, and a conversion of the spherical region into a normalized spherical region. Since the first feature region is one of the partial regions of the first volume image 31 and the second feature region is one of the partial regions of the second volume image 32 as described above, normalization of each of the extracted feature regions into a spherical region corresponds to the above-described normalization of each of the extracted partial regions into the spherical region.

Accordingly, in the determination of the global conversion function in the example illustrated in FIG. 5, the conversion function determination unit 222 converts each of the extracted feature regions into an ellipsoidal region based on Equations 1-5, converts the ellipsoidal region into a spherical region, and converts the spherical region into a normalized spherical region by normalizing the spherical region. However, when the conversion function determination unit 222 previously performs the normalization on partial regions corresponding to the extracted feature regions by performing the selection of the second feature region corresponding to the first feature region based on Equations 1-5, the determination of the global conversion function in the example illustrated in FIG. 5 may be based on a result of the previously performed normalization.

In general, the parameters include a parameter representing a location change of the voxels corresponding to each of the extracted feature regions, a parameter representing an orientation transformation of the voxels corresponding to each of the extracted feature regions, or a combination thereof. An example of the parameters representing the location change of the voxels corresponding to each of the extracted feature regions is a covariance matrix $\Sigma$ in Equation 1, and an example of the parameter representing the orientation transformation of the voxels corresponding to each of the extracted feature regions is a rotation matrix R in Equation 3.

In an example, the conversion function determination unit 222 determines a first parameter to convert the first feature region into a spherical region and a second parameter to convert the second feature region into a spherical region and determines the conversion function between the partial regions of the first volume image 31 and the partial regions of the second volume image 32 based on the first parameter and the second parameter. In this case, the first parameter includes a parameter representing a location change of the voxels corresponding to the first feature region, a parameter representing an orientation transformation of the voxels corresponding to the first feature region, or a combination thereof. Similarly, the second parameter includes a parameter representing a location change of the voxels corresponding to the second feature region, a parameter representing an orientation transformation of the voxels corresponding to the second feature region, or a combination thereof.

Figure 8:
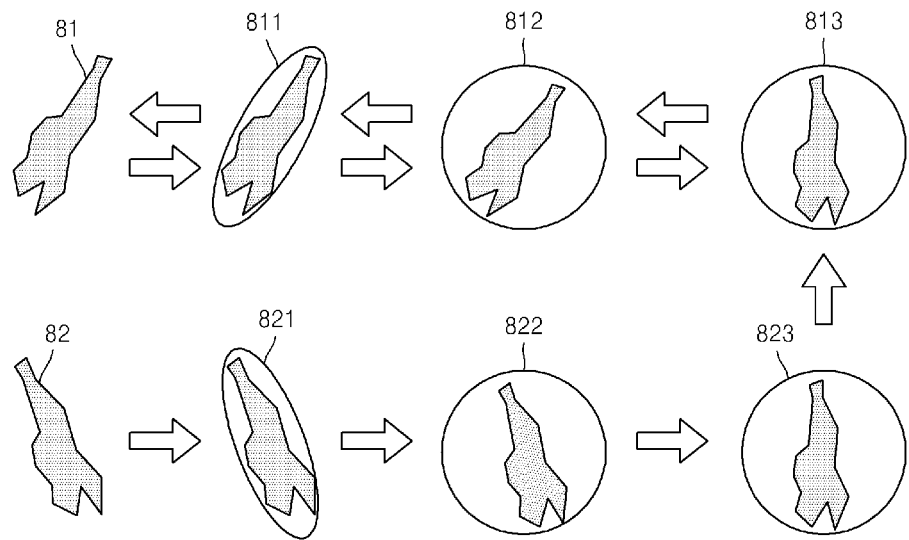
FIG. 8 is a diagram illustrating an example of a process of determining a conversion function between a first feature region and a second feature region.

FIG. 8 is a diagram illustrating an example of a process of determining a conversion function between a first feature region and a second feature region. Referring to the example illustrated in FIG. 8, the conversion function determination unit 222 generates a normalized spherical region 813 by normalizing a first feature region 81 of the first volume image into a spherical region. As described above, based on Equations 1-5, the conversion function determination unit 222 converts the first feature region 81 of the first volume image into an ellipsoidal region 811, converts the ellipsoidal region 811 into a spherical region 812, and generates the normalized spherical region 813 by normalizing the spherical region 812. Similarly, the conversion function determination unit 222 generates a normalized spherical region 823 by normalizing a second feature region 82 of the second volume image to a spherical region. In this case, based on Equations 1-5, the conversion function determination unit 222 converts the second feature region 82 of the second volume image into an ellipsoidal region 821, converts the ellipsoidal region 821 into a spherical region 822, and generates the normalized spherical region 823 by normalizing the spherical region 822.

$$y_1 = R_1 \Sigma_1^{-T/2}(x_1 - c_1) \quad \text{[Equation 6]}$$

$$y_2 = R_2 \Sigma_2^{-T/2}(x_2 - c_2) \quad \text{[Equation 7]}$$

Referring further to the example illustrated in FIG. 8, the conversion function determination unit 222 determines one or more parameters to convert each of the extracted first and second feature regions 81 and 82 into a spherical region and determines a conversion function between the first and second feature regions 81 and 82 based on the parameters.

As an example, the conversion function determination unit 222 defines a normalized spherical region with respect to voxels $x_1$ corresponding to the first feature region 81, as in Equation 6, which is a modification of Equation 3. In Equation 6, $c_1$ denotes a central voxel from among the voxels included in the ellipsoidal region 811, $\Sigma$ denotes a covariance matrix, and $R_1$ denotes a rotation matrix of the first feature region 81.

$$y_1 = R_1 \Sigma^{-T/2}(x_1 - c_1) \quad \text{[Equation 6]}$$

Similarly, as an example, the conversion function determination unit 222 defines a normalized spherical region with respect to voxels $x_2$ corresponding to the second feature region 82, as in Equation 7, which is a modification of Equation 3. In Equation 7, $c_2$ denotes a central voxel from among the voxels included in the ellipsoidal region 821, $\Sigma$ denotes a covariance matrix, and $R_2$ denotes a rotation matrix of the second feature region 82.

$$y_2 = R_2 \Sigma^{-T/2}(x_2 - c_2) \quad \text{[Equation 7]}$$

Referring further to the example illustrated in FIG. 8, the conversion function determination unit 222 determines the conversion function between the first feature region 81 and the second feature region 82 based on the determined parameter. The determined parameter includes the first parameter for the first feature region 81 and the second parameter for the second feature region 82. As described above, the first parameter includes the parameter representing a location change of the voxels corresponding to the first feature region 81, the parameter representing an orientation transformation of the voxels corresponding to the first feature region 81, or a combination thereof. In addition, the second parameter includes the parameter representing a location change of the voxels corresponding to the second feature region 82, the parameter representing an orientation transformation of the voxels corresponding to the second feature region 82, or a combination thereof. The first and second parameters representing location changes denote covariance matrices, and the first and second parameters representing orientation transformations denote rotation matrices.

Referring further to the example illustrated in FIG. 8, the conversion function determination unit 222 determines the conversion function between the first feature region 81 and the second feature region 82 based on the first and second parameters. In an example, the conversion function determination unit 222 defines the conversion function between the first feature region 81 and the second feature region 82 as in Equation 8, which is a modification of Equations 6 and 7.

$$x_1 = \Sigma^{T/2}{}_1 R_1^T R_2 \Sigma^{-T/2}{}_2 (x_2 - c_2) + c_1 \quad \text{[Equation 8]}$$

Referring to Equation 8 and further to the example illustrated in FIG. 8, the conversion function between the first feature region 81 and the second feature region 82 is defined as a relationship in which the voxels $x_2$ corresponding to the second feature region 82 are converted into the voxels $x_1$ corresponding to the first feature region 81. In other words, in an example, the conversion function determination unit 222 converts the voxels corresponding to the second feature region 82 into the voxels corresponding to the first feature region 81 by converting the voxels corresponding to the second feature region 82 into the normalized spherical region 823 through normalization and converting the normalized spherical region 813 into the voxels corresponding to the first feature region 81 through inverse normalization of the normalized spherical region 813.

Referring back to the selection of the second feature region corresponding to the first feature region in the example illustrated in FIG. 5, the conversion function determination unit 222 selects a first feature region from one or more partial regions of the first volume image 31 and selects a second feature region corresponding to the selected first feature region from one or more partial regions of the second volume image 32. The first feature region and the second feature region are defined as a first corresponding pair. Similarly, the conversion function determination unit 222 selects another first feature region from the partial regions of the first volume image 31, and selects a another second feature region corresponding to the selected other first feature region from the partial regions of the second volume image 32. The other first feature region and the other second feature region are defined as a second corresponding pair.

In an example, the conversion function determination unit 222 selects one or more corresponding pairs between the first feature regions and the second feature regions. In such an example, referring to the example illustrated in FIG. 3, the conversion function determination unit 222 compares the partial regions 311 and 312 extracted from the first volume image 31 with the partial regions 321, 322, and 323 extracted from the second volume image 32, selects the first and second feature regions 311 and 321 included in a first corresponding pair and the first and second feature regions 312 and 322 included in a second corresponding pair. As described above, the conversion function determination unit 222 may select one or more corresponding pairs.

Referring further to the determination of the global conversion function in the example illustrated in FIG. 5, the conversion function determination unit 222 determines the global conversion function between the first and second volume images, based on the conversion function between the first and second feature regions. In an example, the global conversion function between the first volume image and the second volume image generally denotes a conversion function between the voxels corresponding to the second volume image and voxels corresponding to the first volume image. The conversion function between the voxels corresponding to the first volume image and the voxels corresponding to the second volume image denotes a conversion function of the voxels corresponding to the second volume image to match the voxels corresponding to the second volume image to the voxels corresponding to the first volume image.

In an example, the voxels corresponding to the first volume image denote the voxels included in the first volume image. Similarly, in this example, the voxels corresponding to the second volume image denote the voxels included in the second volume image.

In another example, the voxels corresponding to the first volume image denote only voxels having intensities equal to or greater than a critical value from among the voxels included in the first volume image. Accordingly, in this other example, the determination of the global conversion function between the first and second volume images based on the conversion function between the first and second feature regions denotes conversion of the voxels included in the first volume image into the voxels included in the second volume image based on the conversion function between the first and second feature regions. For example, the conversion function determination unit 222 may convert the voxels included in the first volume image into the voxels included in the second volume image based on Equation 8 representing the conversion function between the first and second feature regions.

As described above, the conversion function determination unit 222 determines a conversion function between first feature regions and second feature regions, the first and second feature regions respectively constituting one or more corresponding pairs. As an example, the conversion function determination unit 222 determines a first conversion function between one of the first feature regions and one of the second feature regions that corresponds to the one of the first feature regions, and determines a second conversion function between an other one of the first feature regions and an other one of the second feature regions that corresponds to the other one of the first feature regions.

As an additional example, the conversion function determination unit 222 determines the global conversion function between the first volume image and the second volume image based on one or more conversion functions. As a further example, the conversion function determination unit 222 determines the global conversion function between the first volume image and the second volume image, based on one or more of the conversion functions.

In a general example, the conversion function determination unit 222 selects one or more of the conversion functions by warping the second volume image in relation to the first volume image according to each of the conversion functions and comparing results of the warping. In other words, the conversion function determination unit 222 compares a result of warping the second volume image based on a first conversion function with a result of warping the second volume image based on a second conversion function and selects the first or second conversion function according to a result of the comparison.

In a general example, the conversion function determination unit 222 compares the result of warping the second volume image based on the first conversion function with the result of warping the second volume image based on the second conversion function based on similarity between volumes. The similarity between volumes denotes a similarity between the result of warping the second volume image based on one of the conversion functions and the first volume image. Accordingly, in an example, the conversion function determination unit 222 calculates a first similarity between the result of warping the second volume image based on the first conversion function and the first volume image and a second similarity between the result of warping the second volume image based on the second conversion function and the first volume image, and selects the first similarity or the second similarity depending on which similarity has a greater value and the respective conversion function that corresponds to the selected similarity. In another example, the similarity between volumes denotes a similarity between a distribution of the intensities of the voxels of the first volume image and that of the intensities of the voxels of the result of the warping the second volume image, or a similarity in the magnitude and direction of an intensity gradient between voxels corresponding to same locations. An example of the similarity between the distribution of the intensities of the voxels is normalized mutual information.

The conversion function determination unit 222 determines the global conversion lunation between the first and second volume images, based on the conversion function between the first and second feature regions. In an example, the conversion function between the first feature region and the second feature region denotes one or more conversion functions selected from one or more conversion functions based on one or more similarities as described above. As a further example, the conversion function determination unit 222 selects M conversion functions from one or more conversion functions and determines a global conversion function maximizing the similarity between the first volume image and the second volume image by applying an optimization algorithm to the M conversion functions. An example of the optimization algorithm is a Downhill Simplex. However, the optimization algorithm may be any of various optimization algorithms known to one of ordinary skill in the art. For example, the optimization algorithm may be not only a Downhill simplex algorithm but also a Conjugate Gradient algorithm or a Powell algorithm, or may be a group of one or more optimization algorithms. In an example where M>N and L=M−N, when N conversion functions are selected from the conversion functions, the conversion function determination unit 222 samples and generates L conversion functions, of which there are a shortage, from around each of the first feature regions and the second feature regions associated with the N conversion functions.

In another example, the conversion function determination unit 222 may determine the global conversion function between the first volume image and the second volume image based on one or more of the conversion functions as is without applying the optimization algorithm. As an example, the conversion function determination unit 222 determines Equation 8, which represents the conversion function between the first volume image and the second volume image, to be the global conversion function.

In another example, the conversion function determination unit 222 performs refinement with respect to the determined global conversion function. As an example, the conversion function determination unit 222 performs refinement with respect to the determined global conversion function by applying the global conversion function to the second volume image, sampling a conversion function between a result of the application of the global conversion function and the second volume image, and applying the optimization algorithm to the sampled conversion function again. The refinement denotes updating of the global conversion function.

As described above, in another example, the partial region denotes a region composed of a single voxel. To this end, the partial region extraction unit 221 compares the voxels included in the first volume image and determines one voxel from the voxels included in the first volume image to be the partial region of the first volume image 31. As an example, the partial region extraction unit 221 compares the voxels included in the first volume image and determines one voxel having the greatest intensity of the voxels included in the first volume image as the partial region of the first volume image 31. Similarly, the partial region extraction unit 221 compares the voxels included in the second volume image and determines one voxel having the greatest intensity of the voxels included in the second volume image as the partial region of the second volume image 32.

Figure 9:
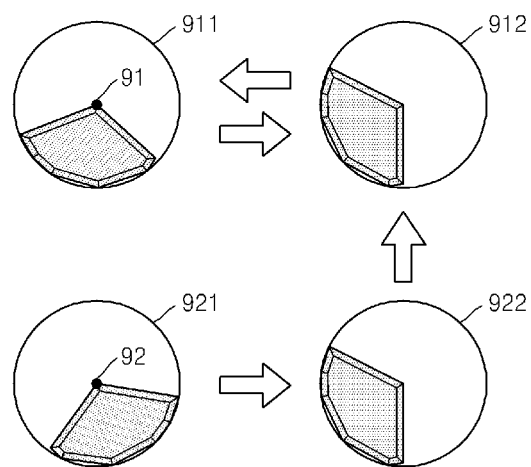
FIG. 9 is a diagram illustrating an example of another process of determining a conversion function between a first feature region and a second feature region.

FIG. 9 is a diagram illustrating an example of another process of determining a conversion function between a first feature region and a second feature region. Referring to the examples illustrated in FIGS. 5 and 9, the partial region extraction unit 221 determines a first feature region 91 from one or more partial regions of the first volume image 31 including a single voxel and determines a second feature region 92 from one or more partial regions of the second volume image 32 including a single voxel. To this end, the partial region extraction unit 221 converts the partial region of the first volume image 31 and the partial region of the second volume image 32 into spherical regions 911 and 921, respectively, converts the spherical regions 911 and 921 into normalized spherical regions 912 and 922 via normalization, and selects (51) the first feature region 91 from the partial region of the first volume image 31 and the second feature region 92 from the partial region of the second volume image 32 based on morphological characteristics determined from the normalized spherical regions 912 and 922. The partial region extraction unit 221 determines the global conversion function between the first and second volume images based on the conversion function between the first and second feature regions 91 and 92. As described above, the application of the example illustrated in FIG. 5 to the example illustrated in FIG. 9 is supported by the description made above with respect to the partial regions respectively composed of one or more voxels.

In another example, the partial region of the first volume image 31, the partial region of the second volume image 32, the first feature region 91, and the second feature region 92 are each composed of a single voxel, and, as such, Equations 6 and 7 are replaced by Equations 9 and 10 from which covariance matrices have been excluded, respectively.

$$y_1 = R_1(x_1 - c_1) \quad \text{[Equation 9]}$$

$$y_2 = R_2(x_2 - c_2) \quad \text{[Equation 10]}$$

As another example, the conversion function between the first feature region 91 and the second feature region 92 in the example illustrated in FIG. 9 is represented as in Equation 11. Alternatively, the conversion function between the first feature region 91 and the second feature region 92 in the example illustrated in FIG. 9 is represented as in Equation 12, which is obtained by excluding a rotation between volume images from Equation 11.

$$x_1 = R^T_1 R_2 (x_2 - c_2) + c_1 \quad \text{[Equation 11]}$$

$$x_1 = x_2 - c_2 + c_1 \quad \text{[Equation 12]}$$

Non-described matters of the application of the example illustrated in FIG. 5 to the example illustrated in FIG. 9 are the same as the description given above with respect to the partial regions each being composed of one or more voxels or may be easily inferred by one of ordinary skill in the art, so a detailed description thereof will be omitted here.

While the example illustrated in FIG. 5 has, to this point, been described as an example of the determining of the global conversion function of the example illustrated in FIG. 4, in an example, the partial region extraction unit 221 performs only the determination of the global conversion function. In other words, in an example, the partial region extraction unit 221 extracts one or more partial regions of the second volume image 32 from one or more partial regions of the first volume image 31 and determines the global conversion function based on the conversion function between the extracted partial regions of the first volume image 31 and the extracted partial regions of the second volume image 32 without selecting one or more first feature regions from one or more partial regions of the first volume image 31 and one or more second feature regions from one or more partial regions of the second volume image 32.

As an example, the partial region extraction unit 221 extracts one or more partial regions from the first volume image 31, extracts one or more partial regions from the second volume image 32 respectively corresponding to the extracted partial regions of the first volume image 31, and determines the global conversion function based on a conversion function between each of the extracted partial regions of the first volume image 31 and each of the extracted partial regions of the second volume image 32. In this case, each one of the extracted partial regions of the second volume image 32 may have similar morphological characteristics with each one of the extracted partial regions of the first volume image 31 corresponding to the extracted partial regions of the second volume image 32. Consequently, in another example, the first feature region is one of the partial regions of the first volume image 31, and the second feature region is one of the partial regions of the second volume image 32.

Referring back to the examples illustrated in FIGS. 3 and 4, the combination image data generation unit 223 generates (43) image data of a volume image 33 from image data of the second volume image 32 according to the global conversion function. The image data of the volume image 33 is to be combined with the image data of the first volume image 31 to generate the image data of the volume-panorama image 34. The combination image data generation unit 223 generates the image data of the volume image 33, which is combined with the first volume image 31 to generate the image data of the volume-panorama image 34, from the image data of the second volume image 32 according to the global conversion function. The volume image 33 denotes a volume image obtained by reflecting the global conversion function in the second volume image 32. Accordingly, the volume image 33 denotes an image obtained by matching the second volume image 32 to the first volume image 31.

In general, the combination image data generation unit 223 generates voxels of the volume image 33, which is combined with the first volume image 31 to generate the image data of the volume-panorama image 34, by warping the voxels included in the second volume image 32 in relation to the voxels included in the first volume image 31, according to the global conversion function. As described above, the global conversion function is obtained by applying an optimization algorithm to the conversion function between the first feature region and the second feature region or one in which no optimization algorithms are applied.

Referring further to the examples illustrated in FIGS. 3 and 4, the image data combination unit 224 generates (44) the image data of the volume-panorama image 34 by combining the image data of the first volume image 31 with the image data of the volume image 33 to be combined. The image data combination unit 224 generates the volume-panorama image 34 by combining each of the voxels included in the first volume image 31 with each of the voxels included in the volume image 33 to be combined.

In general, the voxels included in the volume image 33, which is generated from the second volume image 32 according to the global conversion function and is combined with the first volume image 31 to generate the image data of the volume-panorama image 34, correspond to the voxels included in the first volume image 31, respectively. However, the intensity of each of the voxels included in the volume image 33 to be combined may be different from the intensity of each of the voxels included in the first volume image 31 that correspond to the voxels included in the volume image 33 to be combined. The difference between the intensities is generally represented by a shadow effect of an ultrasonic signal. In this case, the image data combination unit 224 generates an intensity of one of the voxels of the volume-panorama image 34 based on an intensity of one of the voxels of the first volume image 31 and an intensity of one of the voxels of the volume image 33 to be combined.

As an example, the image data combination unit 224 determines a higher or lower intensity from among the intensity of one of the voxels of the first volume image 31 and the intensity of one of the voxels of the volume image 33 to be combined to be the intensity of one of the voxels of the volume-panorama image 34. As another example, the image data combination unit 224 determines a mean of the intensity of one of the voxels of the first volume image 31 and the intensity of one of the voxels of the volume image 33 to be combined to be the intensity of one of the voxels of the volume-panorama image 34.

In yet another example, based on Equation 13, the image data combination unit 224 adjusts the intensities of the voxels of the volume image 33 to be combined to make the intensities similar to the intensities of the voxels of the first volume image 31.

$$I'_3 = \frac{\sigma_1}{\sigma_3}(I_3 - \bar{I}_3) + \bar{I}_1 \qquad \text{[Equation 13]}$$

In Equation 13, $I_3$ denotes the intensity of a voxel at an arbitrary location on the volume image 33 to be combined, $I'_3$ denotes the adjusted intensity of the voxel at an arbitrary location, $\bar{I}_1$ denotes a mean of the intensities of the voxels included in the first volume image 31, $\bar{I}_3$ denotes a mean of the intensities of the voxels included in the volume image 33 to be combined, $\sigma_1$ denotes a standard deviation of the intensities of the voxels included in the first volume image 31, and $\sigma_3$ denotes a standard deviation of the intensities of the voxels included in the volume image 33 to be combined.

The image data combination unit 224 determines intensities of the voxels belonging to only the first volume image 31 from among the voxels of the volume-panorama image 34 based on the intensities of the voxels included in the first volume image 31, and determines intensities of the voxels belonging to only the volume image 33 to be combined from among the voxels of the volume-panorama image 34 based on the intensities of the voxels included in the volume image 33 to be combined. In this example, the image data combination unit 224 determines the intensities of the voxels belonging to only the volume image 33 to be combined from among the voxels of the volume-panorama image 34 based on a result of the above-described adjustment of the voxel intensities of the voxels included in the volume image 33 to be combined. The image data combination unit 224 determines intensities of voxels belonging to both the first volume image 31 and the volume image 33 to be combined, namely, intensities of voxels belonging to a common region, from among the voxels of the volume-panorama image 34 based on both the intensities of the voxels included in the first volume image 31 and the intensities of the voxels included in the combined volume image 33. In an example, the determination in consideration of both the intensities of the voxels included in the first volume image 31 and the intensities of the voxels included in the volume image 33 to be combined denotes determination of the intensities of the voxels belonging to the common region to be a mean of the intensities of the voxels included in the first volume image 31 and the intensities of the voxels included in the volume image 33 to be combined.

Figure 10:
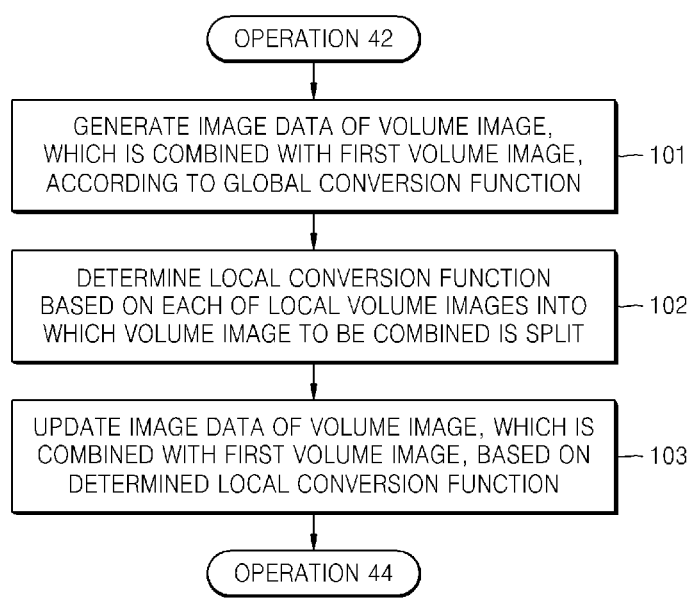
FIG. 10 is a flowchart illustrating an example of generating image data of a volume image to be combined based on the example illustrated in FIG. 4.

FIG. 10 is a flowchart illustrating an example of generating image data of a volume image to be combined based on the example illustrated in FIG. 4. Referring to the examples illustrated in FIGS. 3 and 10, the combination image data generation unit 223 generates (101) the image data of the volume image 33, which is to be combined with the first volume image 31, according to the global conversion function. As the generation of the image data of the volume image 33 has been discussed with respect to the generation of image data of the volume image 33 in the example illustrated in FIG. 4 or may be easily inferred by one of ordinary skill in the art, a detailed description thereof will be omitted here.

The combination image data generation unit 223 determines (102) a local conversion function based on one or more local volume images into which the volume image 33 to be combined is split. For example, the combination image data generation unit 223 splits the volume image 33 to be combined into one or more local volume images and determines a local conversion function for each of the local volume images.

Figure 11:
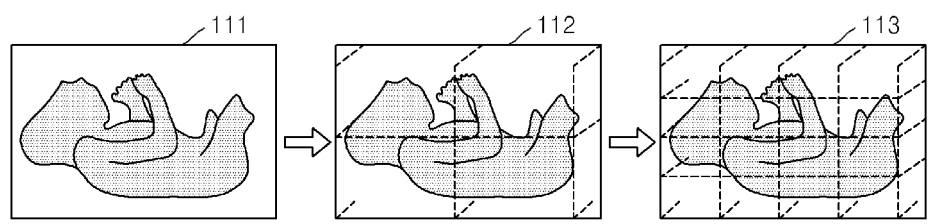
FIG. 11 is a diagram illustrating an example of splitting a volume image to be combined into one or more local volume images.

FIG. 11 is a diagram illustrating an example of splitting the volume image 33 to be combined into one or more local volume images. Referring to the examples illustrated in FIGS. 3 and 11, the combination image data generation unit 223 splits a volume image 111 (33) to be combined into one or more local volume images 112 and determines a local conversion function for each of the local volume images 112. In an example, the combination image data generation unit 223 determines the local conversion function for each of the local volume images 112 based on a conversion function between the voxels corresponding to each of the local volume images 112 and the voxels corresponding to the second volume images 32.

In this case, the combination image data generation unit 223 determines the local conversion function for each of the local volume images 112 by applying an optimization algorithm based on using the conversion function between the voxels corresponding to each of the local volume images 112 and the voxels corresponding to the second volume images 32 as an initial value. As an example, the combination image data generation unit 223 applies an optimization algorithm based on an initial local conversion function (I, O) of each of the local volume images 112 and local conversion characteristics sampled from around the voxels associated with the initial local conversion functions I and O. In the initial local conversion function (I, O), I denotes a unit matrix of 3 columns and 3 rows, and O denotes a 3D O vector.

Referring further to the example illustrated in FIG. 11, as a further example, the combination image data generation unit 223 determines a local conversion function of one of the local volume images 112 based on local conversion functions of local volume images 112 around the one of the local volume images 112. For example, the combination image data generation unit 223 interpolates the local conversion function of one of the local volume images 112 based on the local conversion functions of the local volume images 112 around the one of the local volume images 112.

Referring further to the examples illustrated in FIGS. 3 and 11, the combination image data generation unit 223 hierarchically splits the volume image 111 (33) to be combined. For example, the combination image data generation unit 223 generates the local volume images 112 by splitting the volume image 111 (33) to be combined into four regions and generates the local volume images 113 by splitting each of the local volume images 112. As a further example, the combination image data generation unit 223 adaptively determines how much smaller that regions of each of the local volume images are split, in consideration of the number of textures included in each of the local volume images.

The combination image data generation unit 223 updates (103) the image data of the volume image 33, which is to be combined with the first volume image 31, based on the determined local conversion function. For example, the combination image data generation unit 223 updates the image data of the volume image 33 to be combined by applying the respective local conversion functions for the local volume images to the local volume images into which the volume image 33 to be combined is split. Non-described matters of the example illustrated in FIG. 10 are the same as the matters described above with reference to the examples illustrated in FIGS. 1-9 or may be easily inferred by one of ordinary skill in the art. As a result, a detailed description thereof will be omitted here.

Figure 12:
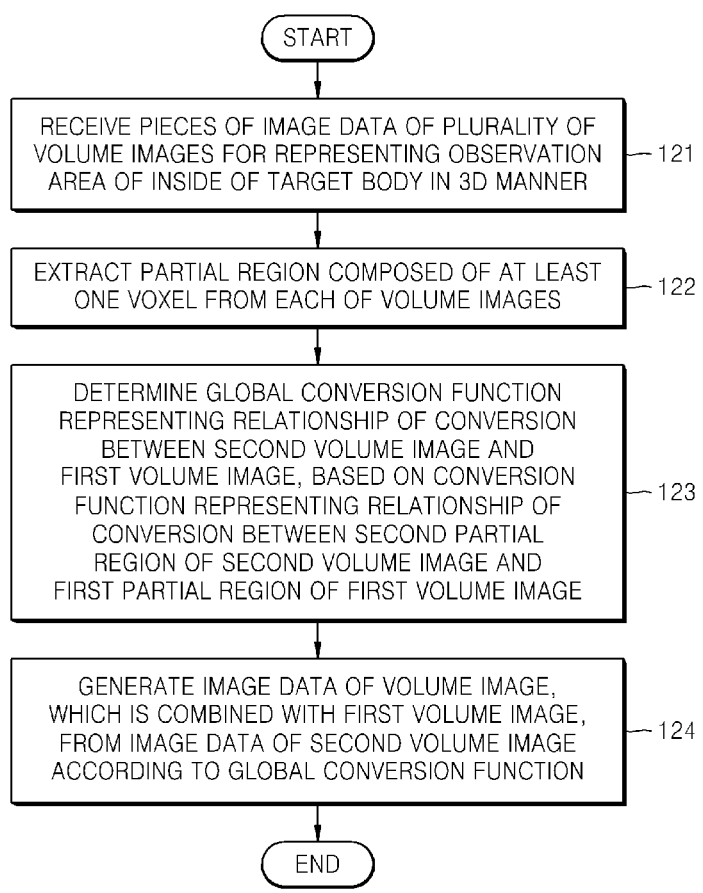
FIG. 12 is a flowchart illustrating an example of a volume-panorama image generating method.

FIG. 12 is a flowchart illustrating an example of a volume-panorama image generating method. The example of the volume-panorama image generating method illustrated in FIG. 12 is performed by the example of the volume-panorama image generating apparatus 20 illustrated in FIG. 2. Accordingly, the description given above with respect to the example of the volume-panorama image generating apparatus 20 illustrated in FIG. 2 is applied even to non-described matters of the example of the volume-panorama image generating method illustrated in FIG. 12.

Referring to the example illustrated in FIG. 12, the input unit 21 receives (121) the pieces of image data of the volume images to represent an observation area of the inner portion of the target 40 in a 3D manner. The partial region extraction unit 221 extracts (122) a partial region composed of at least one voxel from each of the volume images. The conversion function determination unit 222 determines (123) a global conversion function representing a relationship of a conversion between the second volume image and the first volume image, based on a conversion function representing a relationship of a conversion between the partial region of the second volume image and the partial region of the first volume image. The combination image data generation unit 223 generates (124) the image data of the volume image, which is combined with the first volume image to generate the volume-panorama image, from the image data of the second volume image according to the global conversion function.

Figure 13:
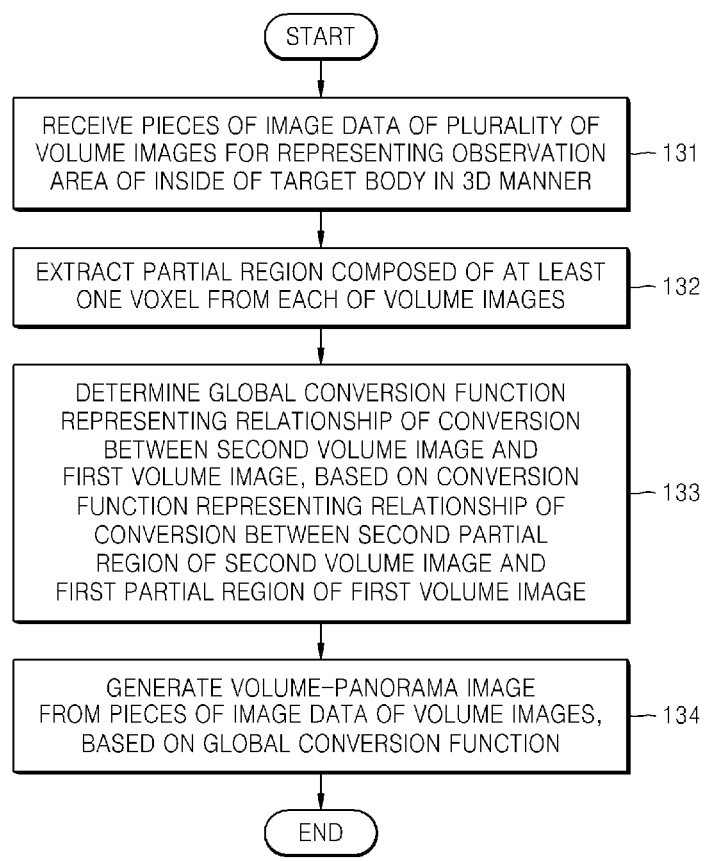
FIG. 13 is a flowchart illustrating another example of a volume-panorama image generating method.

FIG. 13 is a flowchart illustrating another example of a volume-panorama image generating method. The example of the volume-panorama image generating method illustrated in FIG. 13 is performed by the example of the volume-panorama image generating apparatus 20 illustrated in FIG. 2. Accordingly, the description given above with respect to the example of the volume-panorama image generating apparatus 20 illustrated in FIG. 2 is applied even to non-described matters of the example of the volume-panorama image generating method illustrated in FIG. 13.

Referring to the example illustrate in FIG. 13, the input unit 21 receives (131) the pieces of image data of the volume images to represent an observation area of the inner portion of the target 40 in a 3D manner. The partial region extraction unit 221 extracts a partial region composed of at least one voxel from each of the volume images. The conversion function determination unit 222 determines (133) a global conversion function representing a relationship of a conversion between the second volume image and the first volume image, based on a conversion function showing a relationship of a conversion between the partial region of the second volume image and the partial region of the first volume image. The image data combination unit 224 generates (134) the volume-panorama image from the pieces of image data of the volume images, based on the global conversion function.

The units described herein may be implemented using hardware components and software components, such as, for example, microphones, amplifiers, band-pass filters, audio to digital convertors, processing devices, and any other hardware component or software component known to one of ordinary skill in the art. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a 3D (three-dimensional) volume-panorama image, the method comprising:
   receiving pieces of image data of first and second 3D volume images, the pieces representing an observation area of an inner portion of a target in a 3D manner;
   extracting a first partial region comprising one or more voxels from the first 3D volume image;
   extracting a second partial region comprising one or more voxels from the second 3D volume image;
   determining a global conversion function representing a relationship of a conversion between the second 3D volume image and the first 3D volume image, the determined global conversion function being based on a partial region conversion function representing a relationship of a conversion between the second partial region and the first partial region, and the partial region conversion function being based on a conversion of the second partial region and the first partial region into respective spherical regions;
   generating image data of a converted 3D volume image to be combined with the first 3D volume image from image data of the second 3D volume image based on the determined global conversion function,
   comparing the first partial region with the second partial region based on a morphological characteristic of the first partial region and a morphological characteristic of the second partial region, and
   wherein the conversion of the first partial region and the second partial region into the respective spherical regions comprises converting the first partial region and the second partial region into respective ellipsoidal regions and converting the respective ellipsoidal regions into the respective spherical regions.

2. The method of claim 1, wherein the partial region conversion function represents a relationship of a conversion between voxels corresponding to the second partial region and voxels corresponding to the first partial region.

3. The method of claim 1, wherein the partial region conversion function represents a relationship of a conversion between a morphological characteristic of the second partial region and a morphological characteristic of the first partial region.

4. The method of claim 1, wherein the extracting of the first partial region comprises extracting the first partial regions from the first 3D volume image based on intensities of voxels that are included in the first volume image, and the extracting of the second partial region comprises extracting the second partial region from the second 3D volume image based on intensities of voxels that are included in the second 3D volume image.

5. The method of claim 4, wherein the voxels of the second partial region have intensities that are similar among the voxels of the first partial region.

6. The method of claim 1, wherein the partial region conversion function comprises selecting the first partial region as a first feature region and selecting the second partial region as a second feature region corresponding to the first feature region, in which the selecting of the second feature region comprises the comparing of the first partial region with the second partial region based on the morphological characteristic of the first partial region and the morphological characteristic of the second partial region.

7. The method of claim 6, wherein the second feature region is selected based on a similarity between the morphological characteristic of the first partial region and the morphological characteristic of the second partial region.

8. The method of claim 6, wherein the morphological characteristic of the first partial region and the morphological characteristic of the second partial region are determined based on a gradient between intensities of the voxels corresponding to the first partial region and the voxels corresponding to the second partial region.

9. The method of claim 6, wherein the morphological characteristic of the first partial region and the morphological characteristic of the second partial region is determined based on the respective spherical regions.

10. The method of claim 1,
    wherein the determining of the global conversion function further comprises normalizing the respective spherical regions into respective normalized spherical regions; and
    determining the morphological characteristic of the first partial region and the morphological characteristic of the second partial region is based on intensities of voxels corresponding to the respective normalized spherical regions.

11. The method of claim 1, wherein the determining of the global conversion function comprises determining one or more parameters that normalizes the first partial region and the second partial region into the respective spherical regions and determining the partial region conversion function based on the determined parameters.

12. The method of claim 11, wherein the determined parameters comprise one or more parameters representing a location change of voxels corresponding to the second partial region and the first partial region and one or more parameters representing an orientation transformation of the voxels corresponding to the second partial region and the first partial region.

13. The method of claim 11, wherein the determined parameters comprise a first parameter that normalizes the first partial region into a spherical region and a second parameter that normalizes the second partial region into a spherical region.

14. The method of claim 1, wherein the generating of the image data of the converted 3D volume image comprises generating the image data of the converted 3D volume image based on the global conversion function, determining a local conversion function based on one or more local 3D volume images into which the converted 3D volume image is split, and updating the image data of the converted 3D volume image based on the determined local conversion function.

15. The method of claim 1, further comprising:
generating image data of the 3D volume-panorama image, comprising combining the image data of the first 3D volume image with the generated image data of the converted 3D volume image.

16. The method of claim 15, wherein the generating of the image data of the 3D volume-panorama image comprises determining an intensity of one or more voxels of the 3D volume-panorama image based on an intensity of the voxels of the first 3D volume image and an intensity of one or more voxels of the converted 3D volume image.

17. A non-transitory computer-readable recording medium having recorded thereon a program for executing the method of claim 1.

18. A method of generating a 3D (three-dimensional) volume-panorama image, the method comprising:
receiving pieces of image data of first and second 3D volume images, the pieces of the image data representing an observation area of an inner portion of a target in a 3D manner;
extracting a first partial region comprising one or more voxels from the first 3D volume image;
extracting a second partial region comprising one or more voxels from the second 3D volume image;
determining a partial region conversion function representing a conversion between the second partial region and the first partial region, wherein determining the partial region conversion function comprises converting the second partial region and the first partial region into respective spherical regions;
determining a global conversion function representing a conversion of the second 3D volume image into the first 3D volume image from the determined partial region conversion function;
generating the 3D volume-panorama image from the pieces based on the determined global conversion function, and
comparing the first partial region with the second partial region based on a morphological characteristic of the first partial region and a morphological characteristic of the second partial region,
wherein the converting of the first partial region and the second partial region into the respective spherical regions comprises converting the first partial region and the second partial region into respective ellipsoidal regions and converting the respective ellipsoidal regions into the respective spherical regions.

19. A non-transitory computer-readable recording medium having recorded thereon a program for executing the method of claim 18.

20. An apparatus to generate a 3D (three-dimensional) volume-panorama image, the apparatus comprising:
a receiver configured to receive pieces of image data of first and second 3D volume images, the pieces representing an observation area of an inner portion of a target in a 3D manner;
an image processor configured to
extract a first partial region from the first 3D volume image,
extract a second partial region from the second 3D volume image,
determine a global conversion function representing a relationship of a conversion between the second 3D volume image and the first 3D volume image, wherein the global conversion function is based on a partial region conversion function representing a relationship of a conversion between the second partial region and the first partial region, and wherein the partial region conversion function is based on a conversion of the second partial region and the first partial region into respective spherical regions, and
generate the 3D volume panorama image by combining the first and second 3D volume images based on the global conversion function; and
a transmitter configured to output the 3D volume-panorama image,
wherein the partial region conversion function comprises comparing the first partial region with the second partial region based on a morphological characteristic of the first partial region and a morphological characteristic of the second partial region, and
wherein the conversion of the first partial region and the second partial region into the respective spherical regions comprises converting the first partial region and the second partial region into respective ellipsoidal regions and converting the respective ellipsoidal regions into the respective spherical regions.

21. The apparatus of claim 20, wherein the image processor comprises:
a partial region extractor configured to extract the first partial region from the first 3D volume image and the second partial region from the second 3D volume image, the first and second partial regions each comprising one or more voxels;
a conversion function determiner configured to determine the global conversion function;
a combination image data generator configured to generate image data of a converted 3D volume image to be combined with the first 3D volume image from image data of the second 3D volume image according to the global conversion function; and
an image data combiner configured to generate image data of the 3D volume-panorama image by combining the image data of the first 3D volume image with the generated image data of the converted 3D volume image.

* * * * *